Dec. 11, 1956 — A. P. DOUGLAS — 2,773,401
TWO SPEED BICYCLE TRANSMISSION
Filed Dec. 10, 1954 — 2 Sheets-Sheet 1

INVENTOR.
ALVIN P. DOUGLAS
BY Golrick & Golrick
ATTORNEYS

Dec. 11, 1956  A. P. DOUGLAS  2,773,401
TWO SPEED BICYCLE TRANSMISSION
Filed Dec. 10, 1954  2 Sheets-Sheet 2

INVENTOR.
ALVIN P. DOUGLAS
BY Gotrick & Gotrick
ATTORNEYS

2,773,401
TWO SPEED BICYCLE TRANSMISSION

Alvin P. Douglas, Cleveland, Ohio, assignor to The Murray Ohio Manufacturing Company, Cleveland, Ohio, a corporation of Ohio Application December 10, 1954, Serial No. 474,411

4 Claims. (Cl. 74—781)

This invention is directed to improvements in two speed bicycle transmissions of the planetary type.

Experience has shown the gearing and selector mechanisms of planetary two speed bicycle transmissions, of the type disclosed in the Musselman U. S. Patent 2,291,485, dated July 28, 1942, to be efficacious over a period of time but eventually rapid deterioration results in the need for frequent servicing. Rapid wear of the ring gear riding upon the teeth of the planets increases the required pedalling effort.

The general object of the present invention is the provision of a novel bearing arrangement which can be incorporated in the hub and transmission mechanism to overcome the stated difficulties without increasing the spread requirements of the rear fork structure of the bicycle frame.

A more specific object is the provision of anti-friction bearing structures between the ring gear sprocket unit and the hub structure and between the sun gear and the sprocket carrying ring gear in such manner that the planet carrier will be supported independently of the sun gear.

Other objects of the present invention will become apparent from the following description referring to the accompanying drawings showing a preferred embodiment of the invention. The essential characteristics are summarized in the claims.

Figure 1:
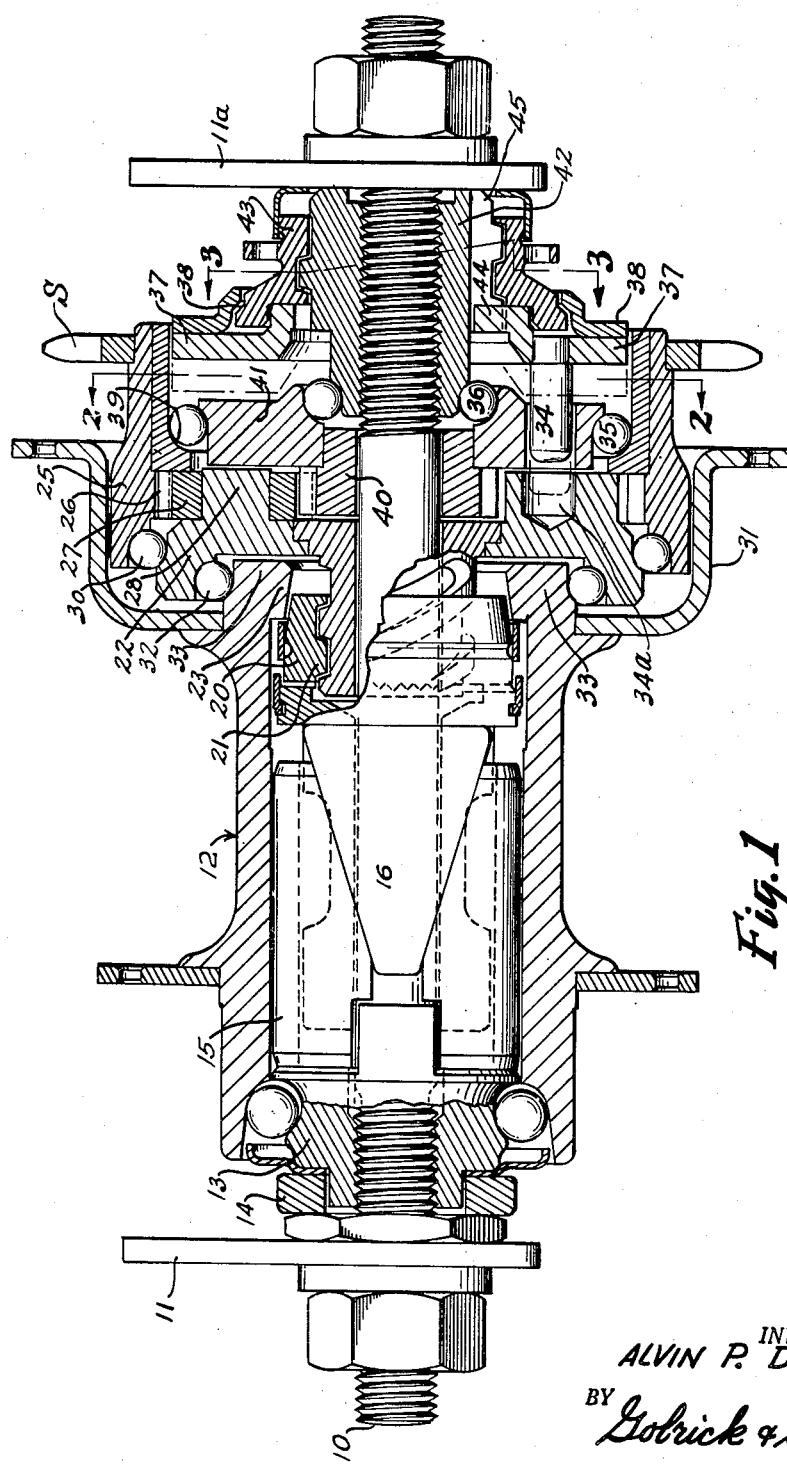
Fig. 1 is a horizontal cross-section taken substantially axially through the hub and axle structure.
Figure 2:
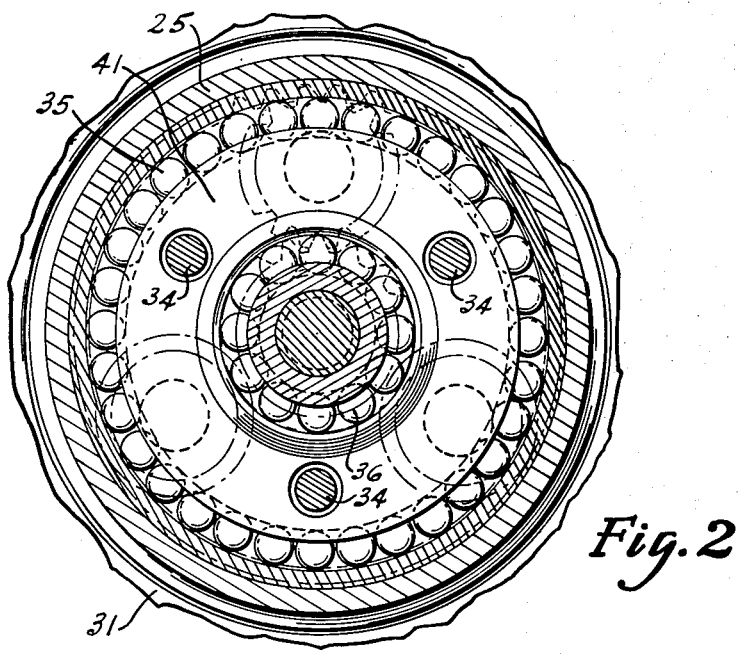
Fig. 2 is a radial section taken along a plane indicated by the line 2—2 of Fig. 1.

Referring to the drawings, Fig. 1 illustrates the transmission combined with a coaster brake mechanism, but the mechanism per se comprises no part of the present invention and hence the brake mechanism is described in general terms. The construction of the elements of the gear system is such that an enlargement of the hub structure houses bearing mountings for the ring gear structure and the planet carrying element, the latter element comprising a brake and clutch operating member. Here the speed selector means, as disclosed in the aforementioned patent, comprises an axially shiftable control means which locks the sun gear and the planet carrier together thus causing all of the gears to revolve as a unit thereby producing direct drive or high speed. When the control is in its other position (as shown in Fig. 1) it holds the sun gear stationary and the planets revolve about the arrested sun gear at a low speed.

Referring to Fig. 1 I show a rear axle 10 of a bicycle supported rigidly on the rear fork prongs 11 and 11a of the frame in the well known manner. The wheel hub 12 is a composite structure including a roughly tubular portion externally formed with spaced cylindrical surfaces inwardly terminated by shoulders to which separately formed wheel spoke anchoring elements are brazed. A torque transmitting bearing member 13 supports the brake side of the composite hub structure, this member 13 having an end projection engaged in the end notch of sleeve 15 which is expanded to braking contact with the bore of the hub by a wedge member 16. The member 13 is non-rotatably engaged with an anchor element 14 having an arm portion (not shown) secured to the frame fork member 11, whereby braking reaction torque is transmitted from brake sleeve 15 to frame member 11 in the usual fashion. The wedge member is shifted from right to left of Fig. 1 by a cone clutch nut 20 upon reverse pedal action in the well known manner. The cone clutch member 20 has a coarse thread connection 21 with the planet carrying member 22 of the transmission and on forward drive cooperates with the female cone portion 23 on the hub to serve as a cone clutch clutching the planet carrier to the hub structure.

The sprocket S, chain driven in the usual manner by the bicycle pedals, is fixed to a ring gear sleeve 25 having an internally toothed ring gear 26 meshing with planet gears 27 rotatably supported on studs 28 formed on the planet carrier 22. The sleeve 25 extends inwardly to an anti-friction bearing structure 30 disposed within an enlargement 31 of the hub structure which includes a wheel spoke anchoring flange. This bearing structure extents about the perimeter of the planetary carrier 22 and the planet carrier has a second bearing 32 resting upon an inner extension 33 of the hub structure.

The sun gear 40 is secured as by brazing to a bearing plate 41 and the bearing plate and sun gear are supported on anti-friction bearing structures 35 and 36. Bearing 35 supports the sprocket carrying sleeve 25 which carries an inner bearing cup 39 and bearing 36 bears upon an adjustable bearing sleeve 42 in threaded engagement with the axle as shown. Axial adjustment of the play of all of the bearings is effected by adjustment of bearing sleeve 42 threaded on the axle.

Figure 3:
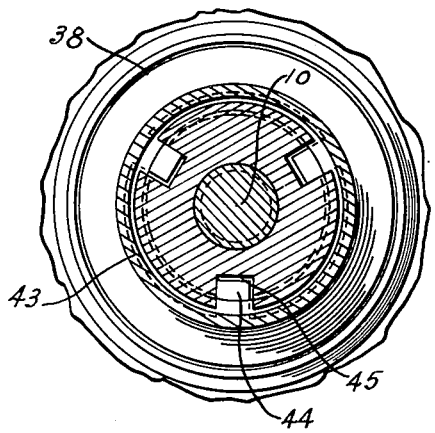
Fig. 3 is a similar section taken along the line 3—3 of Fig. 1.

The transmission control comprises an axially shiftable plate 37 carrying pins 34 extending through openings formed in a sun gear bearing plate 41 and engageable in the planet carrier in sockets 34a. When the pins are shifted from right to left from the position shown in Fig. 1, the sun gear 40 becomes locked to the planet carrier 22 and sprocket, ring gear, planets and sun gear revolve as a unit for direct drive. To further this arrangement the pin carrying plate 37 is provided with a swivel connection at 38 to an axially shiftable and turnable nut member 43 which has a coarse thread connection with the bearing sleeve 42. Turning of the nut may be effected in any suitable manner such as cable and drum or link connections yieldably connected with say a manual shift control element at the forward end of the bicycle. It will be noted in Fig. 3 that the pin carrying plate 37 has three lugs 44 which engage in keyways 45 cut in the coarse male threaded surface of the bearing sleeve 42. When the shifter or control nut 43 advances the pin carrying plate 37 to an inward position, as indicated by the dot and dash lines in Fig. 1, pins 34 engage sockets 34a, the key lugs 44 are withdrawn from the keyways 45, and the plate 37 and pins are free to rotate in mass with the planet carrier, sun gear and sprocket for a direct speed drive.

It will be noted that bearing plate 41 is spaced slightly from the planet carrier and has bearings 35—36 independent of the planet carrier, that the planet carrier has bearings 30—32 independent of the sun gear, and that the shiftable cone clutch member 20 is centered with respect to the hub structure by the bearing supported planet carrier. Likewise the sprocket carrying sleeve 25 has two spaced bearings 30—35 maintaining its alignment with the other transmission elements and that none of the anti-friction bearings are exposed to accumulation of dust and dirt. The resulting arrangement produces a two speed bicycle transmission devoid of frictional drag on the sprocket effort.

I claim:

1. In a two speed planetary gear transmission for a sprocket driven rear wheel in a bicycle, a bicycle rear axle, an axle mounted rear hub structure, a cupped spoke anchor member attached to the hub inwardly of the sprocket end of the hub thereby to provide an external bearing support on the hub end, a planet carrier disposed within the cupped formation of the hub having a circumferential rim thereof overhanging the external bearing support on the hub end to be supported thereby, said planet carrier having a free wheeling connection with the hub, a driving sprocket, a sprocket carrying sleeve constituting a ring gear within said cup shaped anchor member and extending inwardly to overhang the circumference of the planet carrier thereby to afford a bearing on the planet carrier for the inner end of the sleeve adjacent the external bearing between the planet carrier and the hub end, a sun gear bearing on the sprocket sleeve, an adjustable bearing member for the sun gear mounted on the axle, planet gears on the carrier meshing with the sun gear and an axially shiftable plate operable within the sprocket carrying sleeve and having locking pins for locking the sun gear bearing plate and the carrier together at an inward position of the plate and means on the plate engageable with the adjustable bearing member for causing the plate to lock the sun gear to said adjustable bearing member upon an outward shifting of the plate.

2. In a two speed planetary gear transmission for bicycles, the combination of an axle mounted hub structure including a cupped shaped spoke anchor member attached to the hub inwardly of the sprocket end of the hub whereby an external bearing shoulder is provided within the cup formation, a bicycle rear axle, a planet carrier with planet gears disposed within the cup formation, said planet carrier having a bearing rim overhanging said external bearing shoulder of the hub, a free wheeling connection between the hub and carrier, a driving sprocket, a sprocket carrying sleeve extending into the cup formation with the inner end thereof bearing upon the planet carrier, a sun gear meshing with the planet gear and having a radially extending bearing plate, said bearing plate being bearing supported interiorly of said sprocket carrying sleeve by the sleeve, a bearing cone in threaded engagement with the axle and supporting the sun gear bearing plate and axially shiftable means for selectively locking the sun gear bearing plate and the planet carrier together upon an inward shifting of said means and for locking the sun gear to said bearing cone upon an outward shifting of the said means.

3. In a two speed planetary gear transmission for bicycles, the combination of an axle mounted hub structure including a cupped shaped spoke anchor member attached to the hub inwardly of the sprocket end of the hub whereby an external bearing shoulder is provided within the cup formation, a bicycle rear axle, a planet carrier with planet gears disposed within the cup formation, said planet carrier having a bearing rim overhanging said external bearing shoulder of the hub, a free wheeling connection between the hub and carrier, a driving sprocket, a sprocket carrying sleeve extending into the cup formation with the inner end thereof bearing upon the planet carrier, a sun gear meshing with the planet gear and having a radially extending bearing plate, said bearing plate being supported interiorly of said sprocket carrying sleeve, a cone bearing member adjustably threaded on the axle supporting said radially extending bearing plate, and axially shiftable means for selectively locking the sun gear bearing plate and the planet carrier together upon an inward shifting of said means and for locking the sun gear bearing plate to said cone bearing member upon outward shifting of said means.

4. In a two speed planetary gear transmission for bicycles, the combination of an axle mounted hub structure including a cupped shaped spoke anchor member attached to the hub inwardly of the sprocket end of the hub whereby an external bearing shoulder is provided on the hub within the cup formation, a bicycle rear axle, a planet carrier with planet gears disposed within the cup formation, a free wheeling cone clutch mechanism operatively disposed between the planet carrier and the inside of the bearing shoulder, said planet carrier having a bearing rim overhanging said external bearing shoulder of the hub, a driving sprocket, a sprocket carrying sleeve extending into the cup formation with the inner end thereof bearing upon the planet carrier, a sun gear meshing with the planet gear and having a radially extending bearing plate, said bearing plate being supported interiorly of said sprocket carrying sleeve, a cone bearing member on the axle for supporting the sun gear bearing plate, and means for selectively locking the sun gear bearing plate and the planet carrier together comprising an axially shiftable plate operable within the sprocket carrying sleeve and having locking pins for locking the sun gear bearing plate and the planet carrier together and having radially inwardly extending lugs engageable with the cone bearing for locking the sun gear to the cone bearing member.

References Cited in the file of this patent

UNITED STATES PATENTS

| 515,534 | Pritchard | Feb. 27, 1894 |
| 2,171,886 | Musselman | Sept. 5, 1939 |
| 2,291,485 | Musselman | July 28, 1942 |

FOREIGN PATENTS

| 334,512 | France | Oct. 26, 1903 |